(12) United States Patent  (10) Patent No.: US 7,875,332 B2
Sakai  (45) Date of Patent: Jan. 25, 2011

(54) ADHESIVE TAPE AND METHOD OF USE (75) Inventor: Hiroyuki Sakai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 938 days.

(21) Appl. No.: 11/799,335

(22) Filed: May 1, 2007

(65) Prior Publication Data
US 2007/0275202 A1 Nov. 29, 2007

(30) Foreign Application Priority Data
May 26, 2006 (JP) ............................. 2006-146309

(51) Int. Cl.
B32B 9/00 (2006.01)
B65D 65/28 (2006.01)
(52) U.S. Cl. .................... 428/40.1; 428/42.1; 428/42.2; 428/42.3; 428/43
(58) Field of Classification Search ................ 428/40.1, 428/42.1, 42.2, 42.3, 43
See application file for complete search history.

(56) References Cited
U.S. PATENT DOCUMENTS
3,914,483 A * 10/1975 Stipek, Jr. .................. 428/42.3

FOREIGN PATENT DOCUMENTS
JP 05-92022 4/1993

* cited by examiner

Primary Examiner—Victor S Chang
(74) Attorney, Agent, or Firm—Carrier Blackman & Associates, P.C.; Joseph P. Carrier; William D. Blackman (57) ABSTRACT A tape body having an adhesive layer includes a tape center to be affixed to an object and a tape outer periphery continuous to an outer periphery of the tape center and separable therefrom. A release paper includes a release paper center laminated on the tape center except at the outer periphery of the tape center, and a release paper outer periphery at least partially continuous to an outer periphery of the release paper center and separable therefrom. Thus, when the release paper center is separated from the tape center, opposite ends of the tape center adhere to the release paper outer periphery. Therefore, after a part of the tape center is affixed to the object, the tape outer periphery and the release paper outer periphery are separated from the tape center, and the remaining parts of the tape center are affixed to the object, thereby completing the adhesion operation.

5 Claims, 7 Drawing Sheets

ADHESIVE TAPE AND METHOD OF USE

CROSS-REFERENCE TO RELATED APPLICATIONS

The present invention claims priority under 35 USC 119 based on Japanese patent application No. 2006-146309, filed on May 26, 2006. The entirety of the subject matter of this priority document is incorporated by reference herein.

BACKGROUND OF THE INVENTION

1. Field of the Invention

The present invention relates to an adhesive tape comprising a tape body having an adhesive layer on one side, and a release paper for protecting the adhesive layer of the tape body, the release paper being laminated on the tape body.

2. Description of the Related Art

Japanese Patent Application Laid-open No. 5-92022 discloses an adhesive plaster comprising a large number of adhesive plaster bodies arranged on a band-shaped (elongate rectangular shaped) release paper (separation paper) at predetermined intervals, the release paper being longitudinally bisected by a cut (slit) in order to facilitate removal of each adhesive plaster body. The one half of the release paper is removed from an adhesive layer of the adhesive plaster, the adhesive plaster body is pinched at a portion on the side where the adhesive layer is exposed, and the adhesive plaster body is peeled off from the other half of the release paper.

However, in this conventional art, a user is required to pinch the adhesive layer of the adhesive plaster body when removing the adhesive plaster body remaining on the other half of the release paper, leading to a possibility that the adhesive layer is stained and its adhesion ability is reduced.

SUMMARY OF THE INVENTION

The present invention has been achieved in view of the above circumstances, and has as an object to provide an adhesive tape where adhesion work can be performed without an adhesive layer of a tape being touched with fingers when a tape body is removed from a release paper and affixed to an object.

In order to achieve the above object, according to a first feature of the present invention, there is provided an adhesive tape comprising a tape body having an adhesive layer on one side, and a release paper for protecting the adhesive layer of the tape body. The release paper is laminated on the tape body. The tape body includes a tape center portion to be affixed to an object, and a tape outer periphery portion continuous to an outer periphery of the tape center portion so that the tape outer periphery portion can be separated therefrom. In addition, the release paper includes a release paper center portion laminated on the tape center portion except at least a part of the outer periphery of the tape center portion, and a release paper outer periphery portion at least partially continuous to an outer periphery of the release paper center portion so that the release paper center portion can be separated therefrom.

With this arrangement, the tape body comprises the tape center portion to be affixed to the object, and the tape outer periphery portion separatably continuous to the outer periphery of the tape center portion; and the release paper comprises the release paper center portion laminated on the tape center portion except at least a part of the outer periphery of the tape center portion, and the release paper outer periphery portion at least partially continuous to the outer periphery of the release paper center portion. Thus, even if the release paper center portion is separated from the tape center portion, the tape center portion adheres to the release paper outer periphery portion at a part of the outer periphery and is retained integrally with the release paper outer periphery portion. Therefore, after a part of the tape center portion, whose adhesive layer is exposed at such a part, is affixed to the object while holding the tape outer periphery portion and the release paper outer periphery portion with fingers, then the tape outer periphery portion and the release paper outer periphery portion are separated from the tape center portion, and a part of the outer periphery of the tape center portion is affixed to the object, thereby completing the adhesion operation. In this process, since there is no need to touch the adhesive layer of the tape center portion with fingers, formation of a stain on the adhesive layer is prevented and its adhesion ability is improved. Moreover, clean finishing of the adhered portion is ensured.

According to a second feature of the present invention, in addition to the first feature, the release paper center portion and the release paper outer periphery portion are partially continuous along a perforated line.

With this arrangement, since the release paper center portion and the release paper outer periphery portion are partially continuous to each other via the perforated line, the adhesion work of the tape center portion is facilitated by folding the release paper center portion, separated from the tape center portion, along the perforated line. Moreover, since the release paper center portion and the release paper outer periphery portion are connected by the perforated line after removal from the tape center portion, the number of waste pieces including the release papers to be disposed is reduced.

According to a third feature of the present invention, in addition to the second feature, a slit formed between the tape center portion and the tape outer periphery portion is displaced from the perforated line formed between the release paper center portion and the release paper outer periphery portion, and the tape center portion is covered by the release paper outer periphery portion between the slit and the perforated line.

With this arrangement, the slit on the tape body and the perforated line on the release paper are displaced from each other so that the tape center portion is covered by the release paper outer periphery portion between the slit and the perforated line, whereby the tape center portion is reliably retained on the release paper.

According to a fourth feature of the present invention, in addition to the first feature, when the release paper center portion is separated from the tape so as to expose a part of the tape center portion, pinch portions where the tape outer periphery portion and the release paper outer periphery portion remain laminated are formed on opposite sides of the tape center portion.

With this arrangement, when the release paper center portion is separated from the tape body to expose a part of the tape center portion, the pinch portions are formed on the opposite sides of the tape center portion where the tape outer periphery portion and the release paper outer periphery portion remain laminated. Thus, the tape center portion can be easily affixed to the object by holding the pinch portions.

According to a fifth feature of the present invention, in addition to the first feature, each pinch portion has an L-shape.

With this arrangement, the pinch portions in the tape and the release paper are in the L-shape, such that the pinch portions are easily held.

According to a sixth feature of the present invention, in addition to the first feature, the tape center portion has a silhouette corresponding to a silhouette of the object.

With this arrangement, since the tape center portion is provided with the outline corresponding to the outline of the object, the tape center portion can be affixed at an appropriate position by positioning the outline of the tape center portion along the outline of the object.

According to a seventh feature of the present invention, in addition to the first feature, the tape center portion has a band (elongate, substantially rectangular) shape.

With this arrangement, even if the tape center portion has the band-shape and is easy to be twisted upon adhesion, the tape center portion can be appropriately affixed.

A side sill S of a vehicle body in embodiments described below corresponds to the object in the present invention.

The above-mentioned object, other objects, characteristics, and advantages of the present invention will become apparent from a preferred embodiment, which will be described in detail below by reference to the attached drawings.

DESCRIPTION OF THE PREFERRED EMBODIMENT

A first embodiment of the present invention will be described below with reference to FIGS. 1 to 6B.

Figure 1:
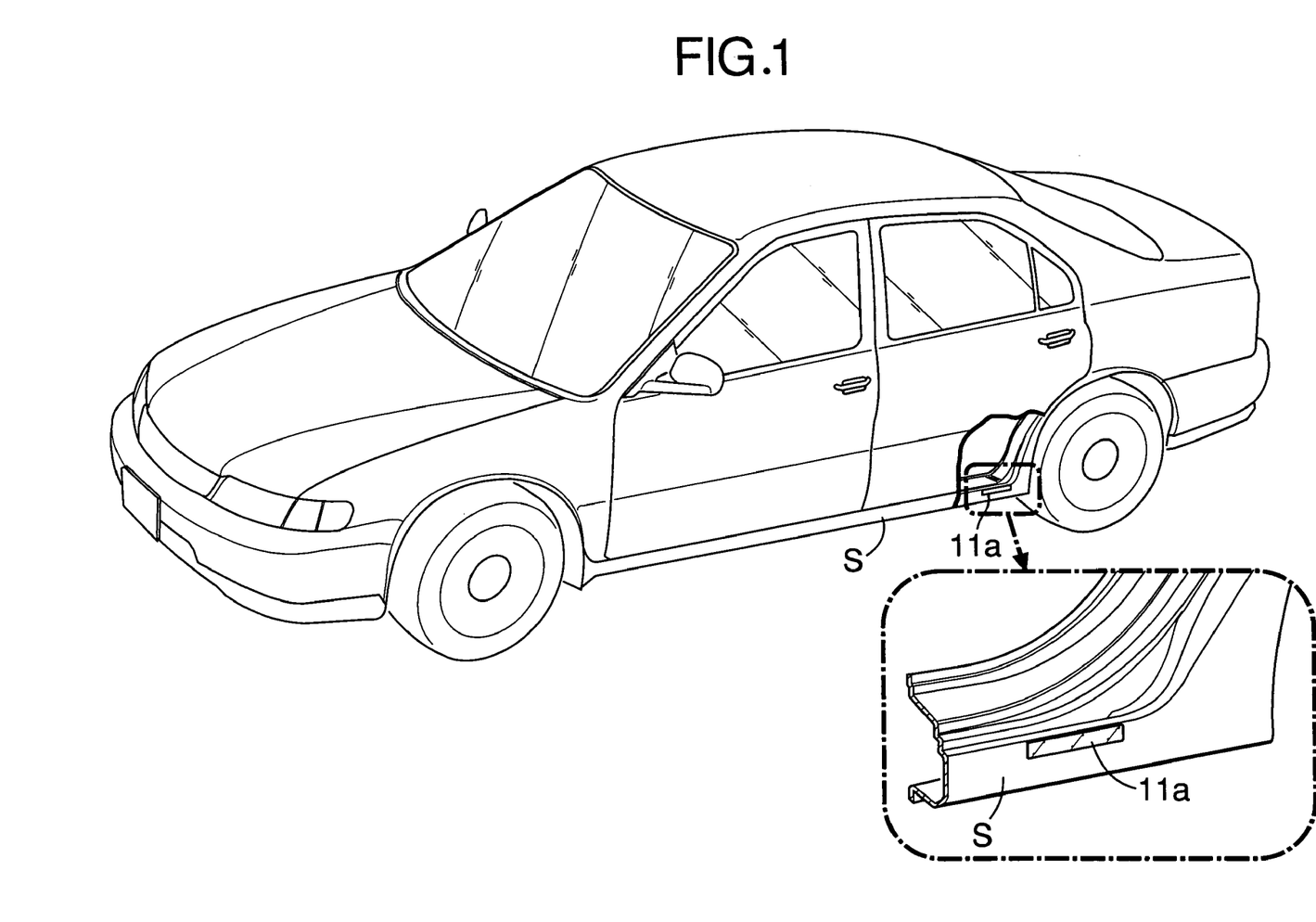
FIG. 1 is a perspective view of an automobile showing a chipping prevention adhesive tape according to a first embodiment of the present invention, in which the chipping prevention adhesive tape is affixed to a side sill of the automobile.

As shown in FIG. 1, a tape (a tape center portion 11a which will be described later) is affixed to a side face of a side sill S of an automobile in order to prevent damage to a painted surface by a stone or the like hitting thereon after being splashed up by a front wheel.

Figure 2A:
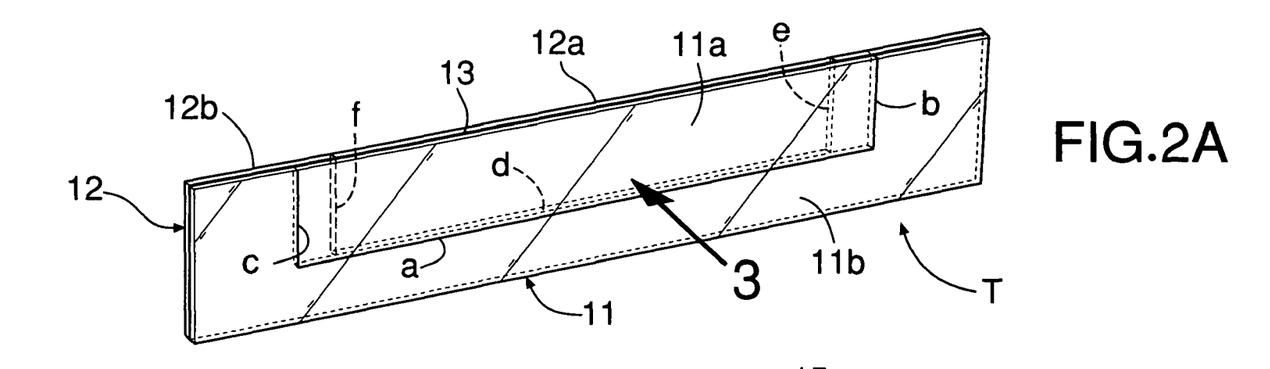
FIG. 2A is a perspective view of the adhesive tape.
Figure 2B:
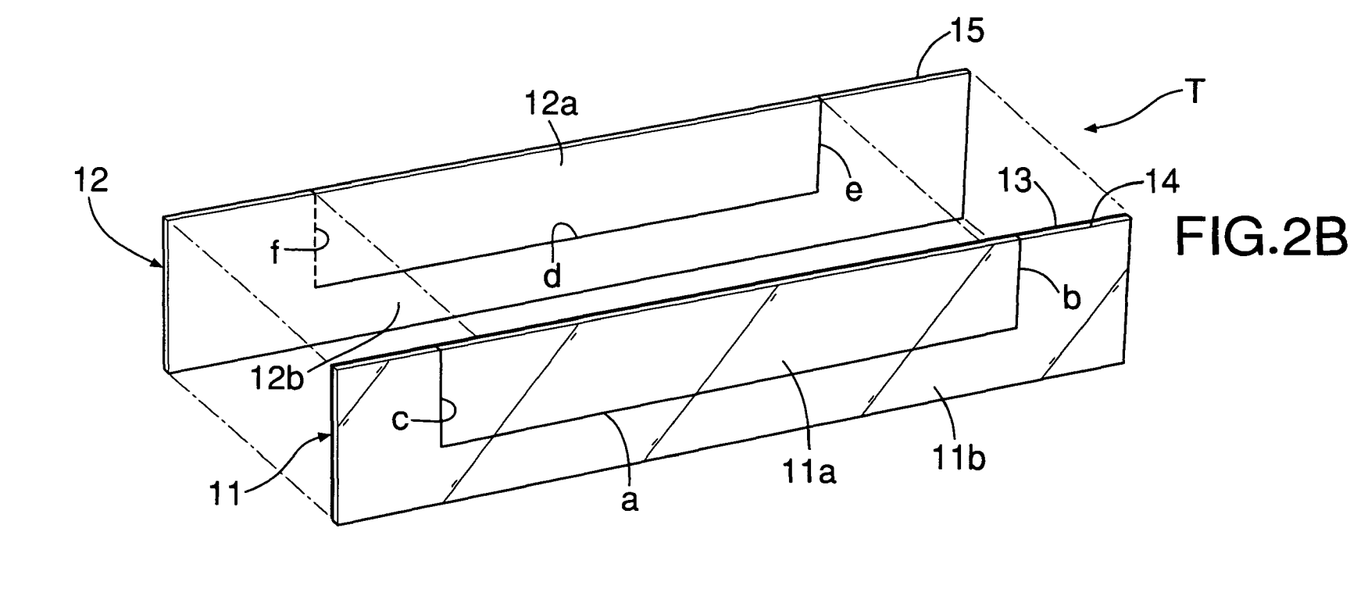
FIG. 2B is an exploded perspective view of the adhesive tape.
Figure 3:
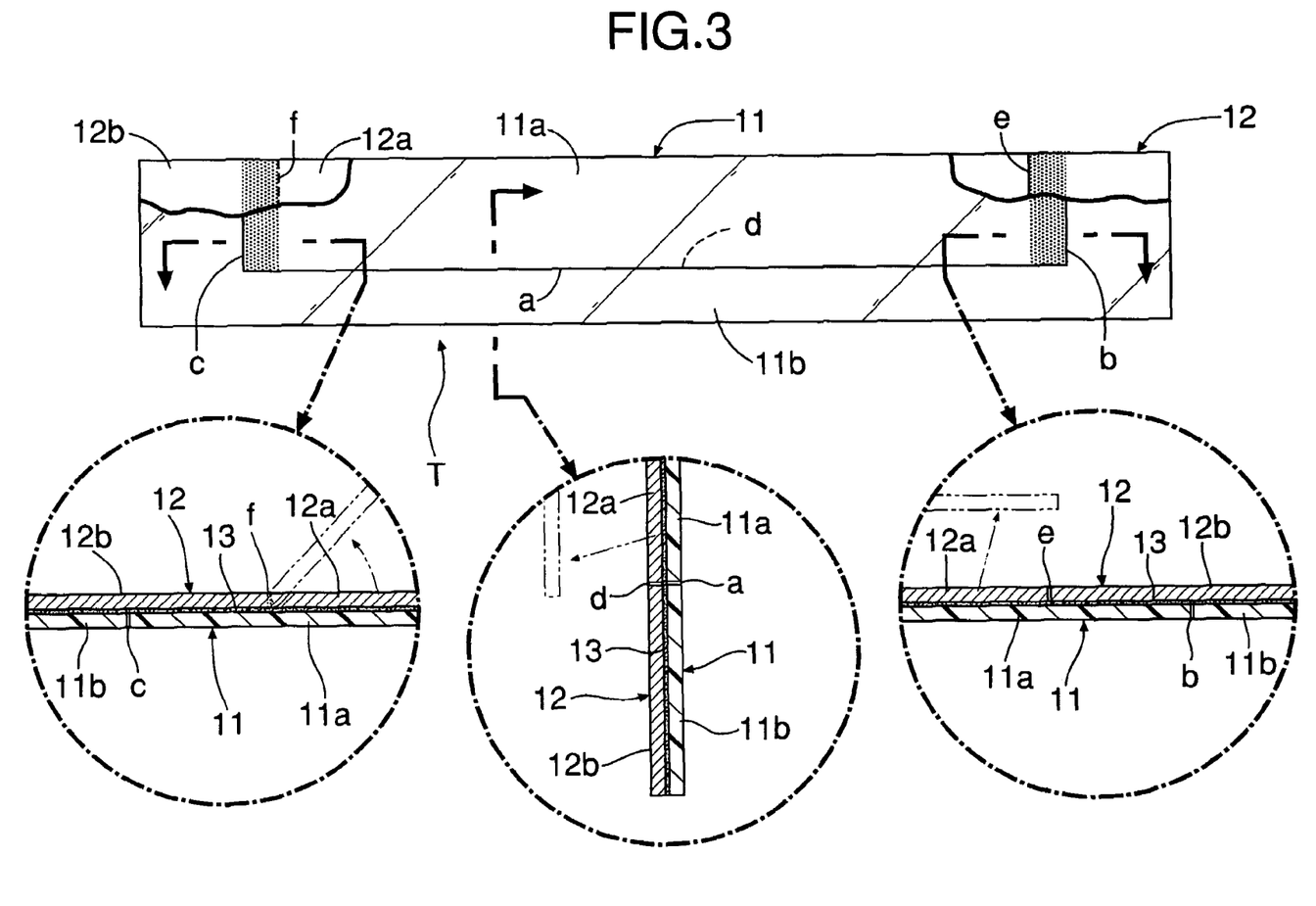
FIG. 3 is a plan view of the adhesive tape as seen in the direction of an arrow 3 in FIG. 2A, including three enlarged, sectional views of portions of the adhesive tape.

As shown in FIGS. 2A, 2B and 3, an adhesive tape T including the tape center portion 11a comprises a tape body 11 made of a synthetic resin on which an adhesive layer 13 is formed on one side, and a release paper 12 of the same dimension laminated on the tape body 11 so as to protect the adhesive layer 13 of the tape body 11. The release paper 12 is subjected to a surface treatment so that the adhesive layer 13 of the tape body 11 is difficult to adhere to the release paper 12. Therefore, the tape body 11 lightly adheres to the release paper 12 so that although they are joined to each other, the release paper 12 can be easily separated from the tape body 11.

The tape body 11 is divided into the tape center portion 11a and a tape outer periphery portion 11b by slits a, b, c which form a U-shape. In use, the tape center portion 11a is affixed to the side sill S, while the tape outer periphery portion 11b is eventually disposed of along with the release paper 12. The release paper 12 is divided into a release paper center portion 12a and a release paper outer periphery portion 12b by two slits d, e and a single perforated line f which generally form a U-shape. During application of the tape T to an object such as the sill S, the release paper center portion 12a is separated from the tape center portion 11a in an initial part of the application process, but the release paper outer periphery portion 12b is not separated from the tape outer periphery portion 11b until the end.

The slit a of the tape body 11 lies parallel to a side edge 14 of the tape body 11, and the slits b, c, provided at opposed ends of the slit a, extend between the side edge 14 and the slit a. Similarly, the slit d of the release paper 12 lies parallel to a side edge 15 of the release paper 12, and the slits e, f, provided at opposed ends of the slit d, extend between the side edge 15 and the slit d. The slit a of the tape body 11 is positioned so as to overlap the slit d of the release paper 12, but the slits b, c of the tape body 11 are located outside the slit e and the perforated line f of the release paper 12 relative to a center of the tape body 11. Therefore, the tape center portion 11a is larger than the release paper center portion 12a by two parts shown by shadows in FIG. 3. The slits a to e completely cut the tape body 11 or the release paper 12. In addition, the release paper 12 folds easily along the perforated line f.

Next, the operation of the first embodiment of the present invention having the above arrangement will be described.

Figure 4A:
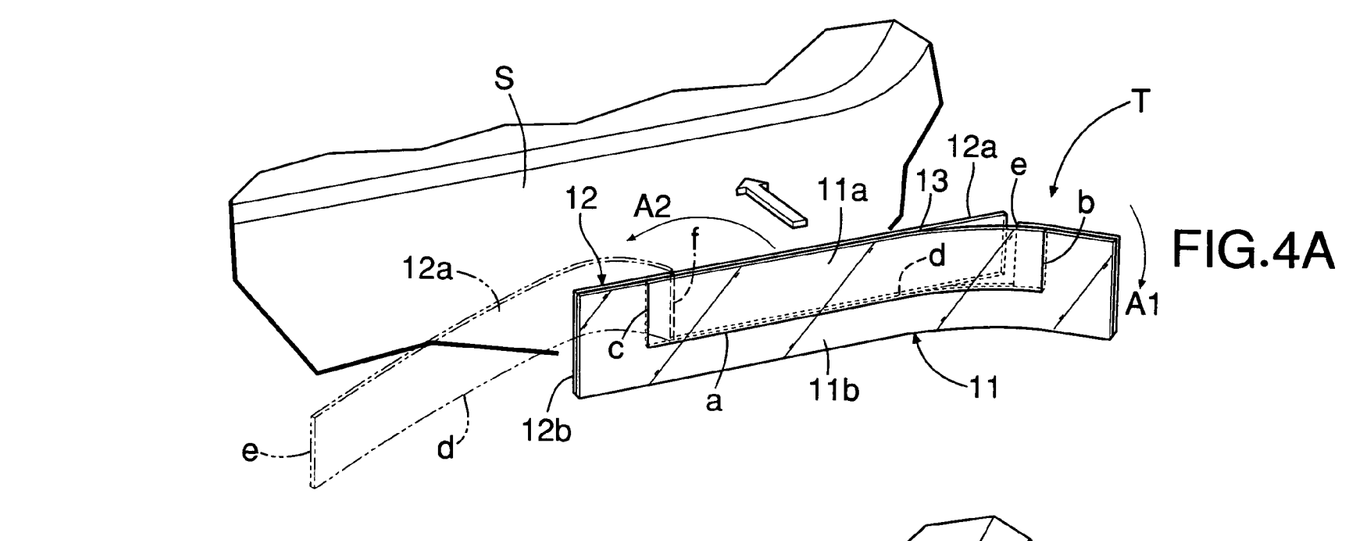
FIGS. 4A and 4B are views showing a first step of affixing process of the adhesive tape.

First, as shown in FIG. 4A, when the adhesive tape T is bent in the vicinity of the slits b, e so as to curve to the tape body 11 side (see an arrow A1), the release paper center portion 12a is separated from the release paper outer periphery portion 12b along the slit e and floated from the tape center portion 11a. Thus, grasping and pulling the floated portion (see an arrow A2) easily separates the release paper center portion 12a from the tape body 11 along the slit d, whereby the tape center portion 11a is exposed.

At this time, since the release paper center portion 12a is slightly smaller than the tape center portion 11a, the opposite ends of the tape center portion 11a in the longitudinal direction are still covered by the release paper outer periphery portion 12b. At this covered portion, the tape center portion 11a adheres to the release paper outer periphery portion 12b, and thus the tape center portion 11a is prevented from being removed from the release paper 12. Since the release paper center portion 12a is connected to the release paper outer periphery portion 12b by the perforated line f, the release paper center portion 12a can be folded along the perforated line f. As a result, the release paper center portion 12a is folded back over, and superposed on the release paper outer periphery portion 12b. Also, since the release paper center portion 12a and the release paper outer periphery portion 12b are connected by the perforated line f and not separated, the number of waste pieces is not increased when the release paper 12 is disposed of after completion of the adhesion operation.

Figure 4B:
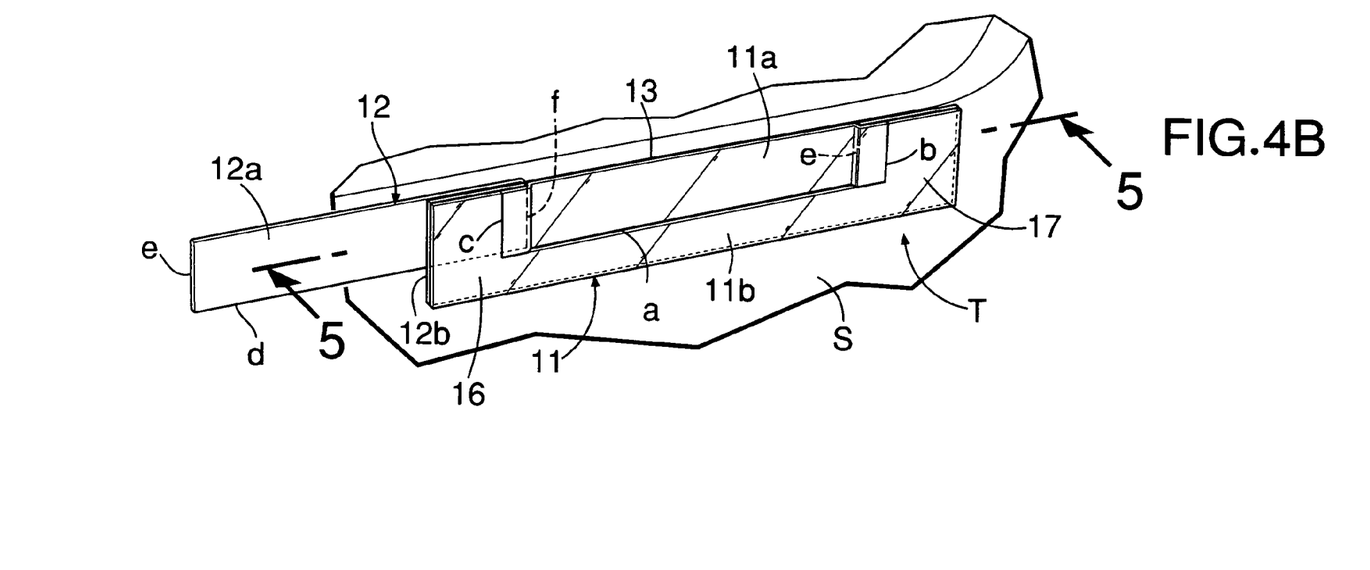
Figure 5:
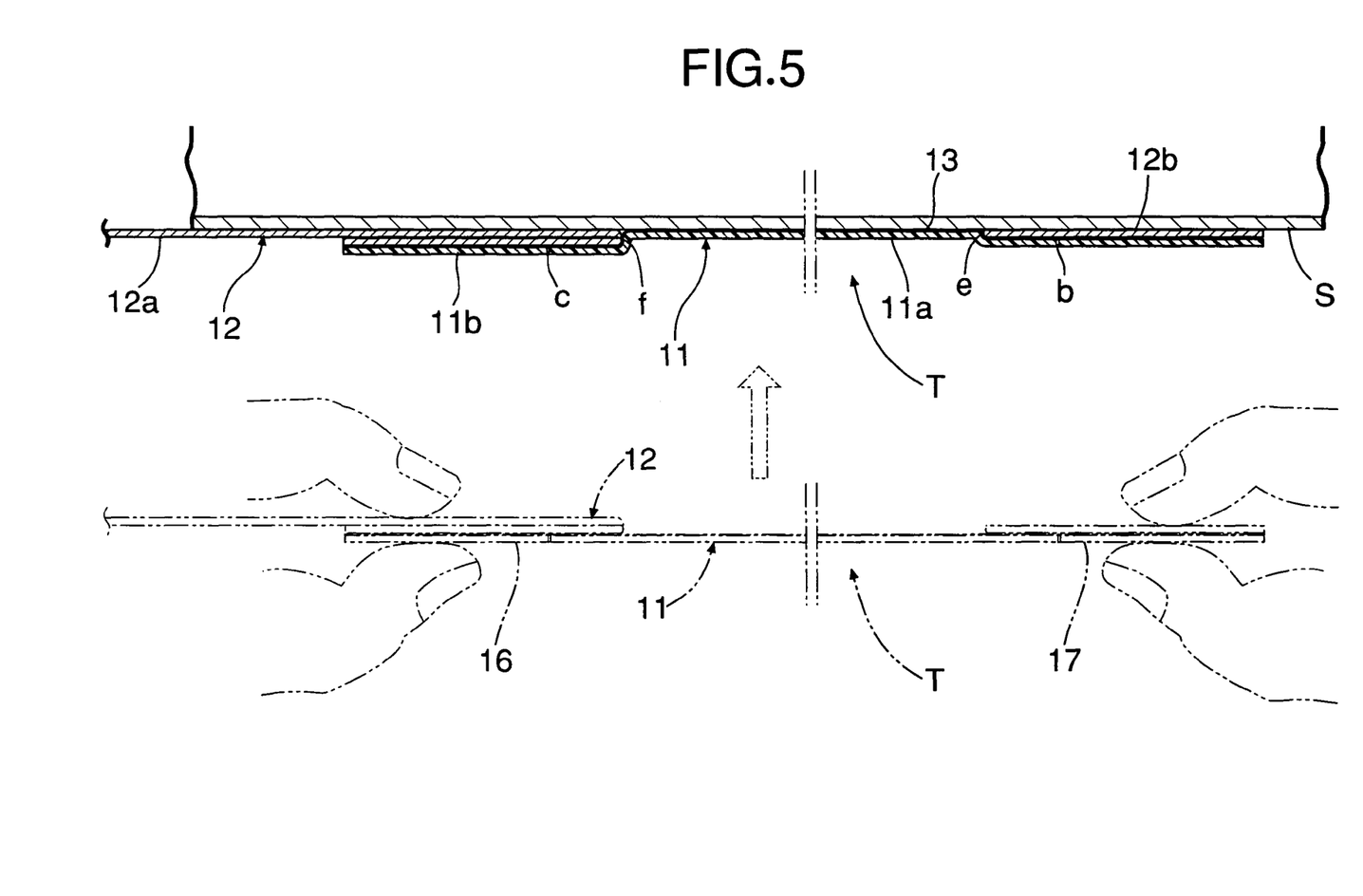
FIG. 5 is a sectional view of the adhesive tape taken along a line 5-5 in FIG. 4B.

Subsequently, as shown in FIGS. 4B and 5, the opposite ends of the adhesive tape T, that is, at portions where the tape outer periphery portion 11b and the release paper outer periphery portion 12b are laminated, in other words, a pair of L-shaped left and right pinch portions 16, 17 are held by the hands, and the tape center portion 11a is positioned at a predetermined position of the side sill S and affixed thereto. In this process, since there is no need to touch the adhesive layer 13 of the tape center portion 11a with fingers, adhesion of dust or fingerprints to the adhesive layer 13 is prevented, whereby an excellent finish is obtained, and moreover, the outline of the tape center portion 11a is aligned with the outline of the side sill S to improve workability and facilitate positioning of the tape center portion 11a on the side sill S.

Figure 6A:
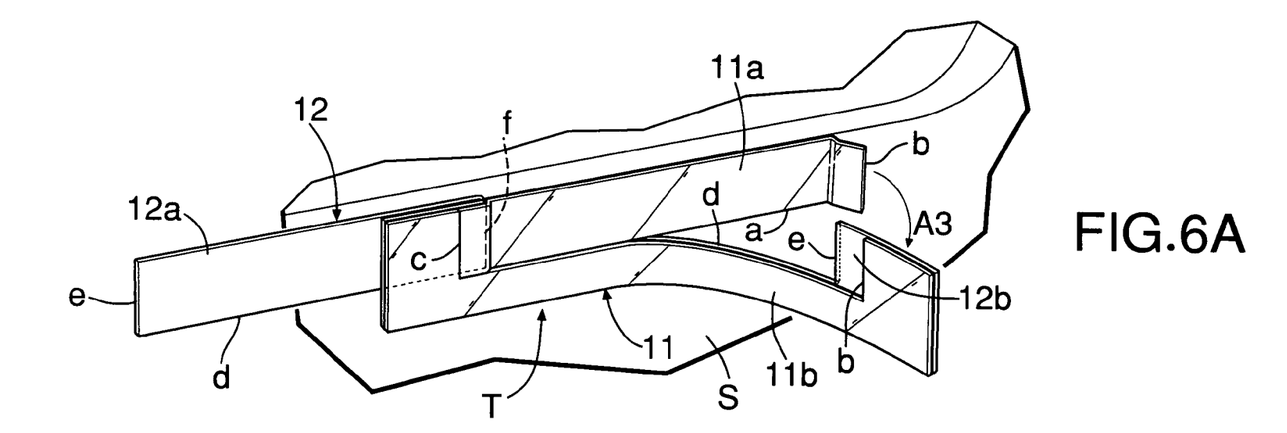
FIGS. 6A and 6B are views showing a second step of the affixing process of the adhesive tape.
Figure 6B:
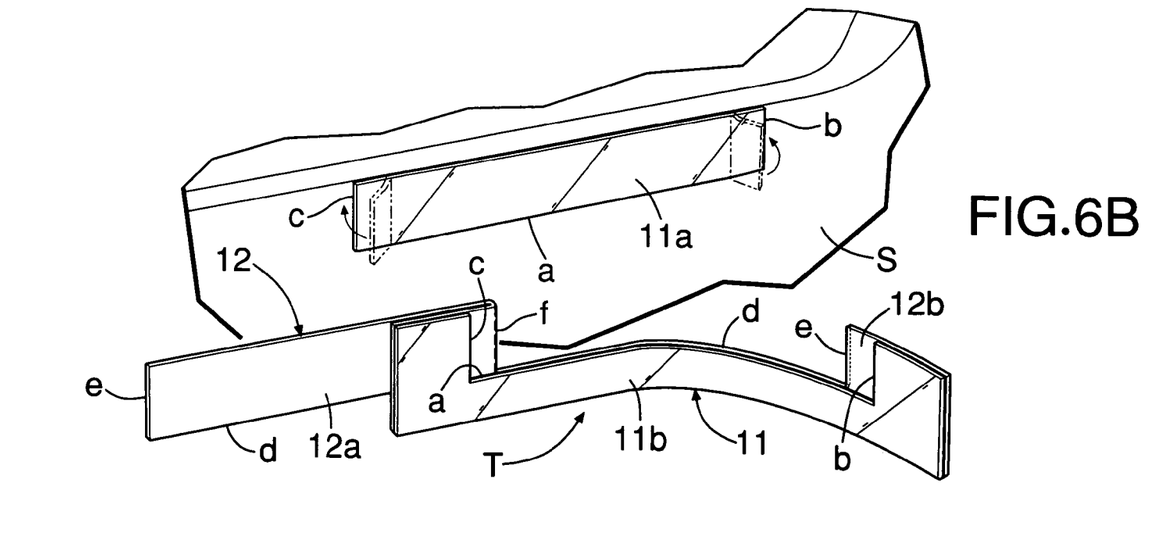

Even when the tape center portion 11a is affixed to the side sill S as described above, the opposite ends of the tape center portion 11a remain covered by the release paper outer periphery portion 12b, and are still not affixed to the side sill S. Then, as shown in FIG. 6A, if the ends on the slits b, e sides of the adhesive tape T are pulled in the direction away from the side sill S (see an arrow A3), one end of the tape center portion 11a not yet affixed to the side sill S is separated from the release paper outer periphery portion 12b. Further as shown in FIG. 6B, the other end of the tape center portion 11a, not yet affixed to the side sill S, is separated from the release paper outer periphery portion 12b, whereby the tape outer periphery portion 11b and the release paper 12 are completely separated from the tape center portion 11a, a part of which is affixed to the side sill S.

Finally, pressing and affixing the opposite ends of the tape center portion 11a to the side sill S complete the adhesion operation of the tape center portion 11a. Since the tape outer periphery portion 11b and the release paper 12, separated from the tape center portion 11a, are still integral, the number of waste pieces is minimized.

Particularly, the band-shaped elongated tape body 11 is easily twisted upon adhesion, but according to this embodiment, the tape body 11 can be affixed at an appropriate position with a good appearance while preventing twisting.

As described above, even when the release paper center portion 12a is separated from the tape center portion 11a, the adhesive layer 13 of the tape center portion 11a is not totally exposed, because the release paper center portion 12a is formed to be slightly smaller than the tape center portion 11a. The adhesive layer 13 is adhered to the release paper outer periphery portion 12b at the opposite ends of the tape center portion 11a, so that the tape center portion 11a is retained on the release paper 12. Therefore, the adhesion operation of the tape center portion 11a can be performed by grasping the opposite ends of the adhesive tape T, thereby eliminating the need to touch the adhesive layer 13 of the exposed tape center portion 11a. Thus, it is possible to prevent stains on the adhesive layer 13 so as to improve adhesion ability and provide excellent finishing of the adhered portion.

Next, other embodiments of the present invention will be described referring to FIGS. 7A to 7C.

Figure 7A:
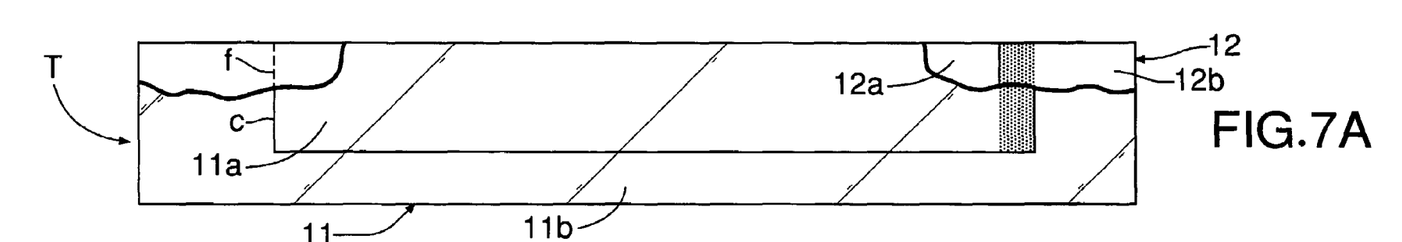
FIG. 7A is a diagram illustrating an adhesive tape according to a second embodiment of the present invention.

In a second embodiment shown in FIG. 7A, the slit c of the tape body 11 is repositioned so as to overlie the perforated line f of the release paper 12, which remains in its previous position. Even with this arrangement, there is no fear that the tape center portion 11a drops off when the release paper center portion 12a is separated from the tape center portion 11a, because one end of the tape center portion 11a is affixed to the release paper outer periphery portion 12b (see the shaded portion).

Figure 7B:
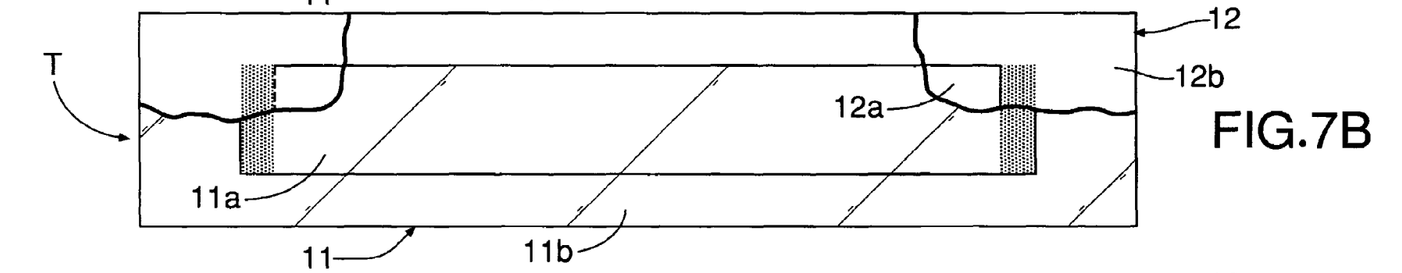
FIG. 7B is a diagram illustrating an adhesive tape according to a third embodiment of the present invention.
Figure 7C:
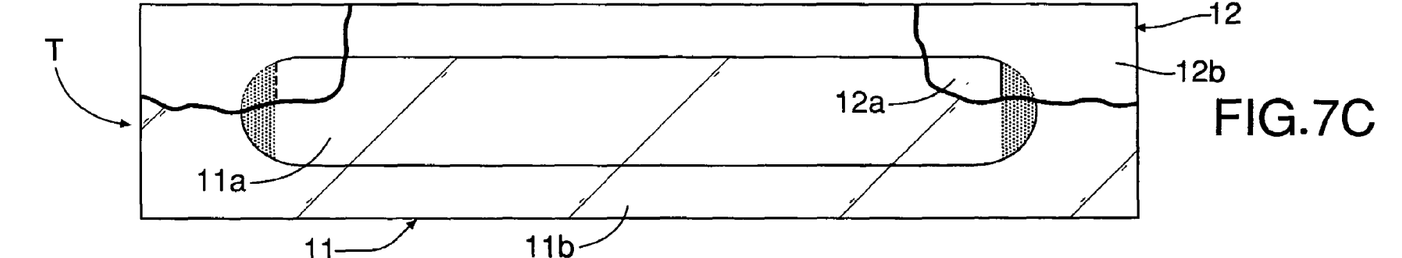
FIG. 7C is a diagram illustrating an adhesive tape according to a fourth embodiment of the present invention.

In the first and second embodiments, the tape center portion 11a is formed along the upper edge of the tape body 11, but in a third embodiment shown in FIG. 7B, the tape center portion 11a is spaced apart from the peripheral edges of the tape body 11 and is formed entirely inside the peripheral edges. Also, in a fourth embodiment shown in FIG. 7C, the tape center portion 11a has semi-spherical shaped opposite ends formed by rounding the opposite ends of the rectangular-shaped tape center portion 11a of the third embodiment. Also the third and the fourth embodiments provide the same effects as those of the first and the second embodiments.

The embodiments of the present invention have been described above, but various changes in design may be made without departing from the subject matter of the present invention.

The side sill S of an automobile is illustrated, for example, as the object in the embodiments, but the adhesive tape T of the present invention may be applied to any object.

Also, the adhesive tape T in the embodiments is used for prevention of chipping, but the adhesive tape T may be applied for any purpose.

Also, in the embodiments, the release paper center portion 12a of the release paper 12 and a part of the release paper outer periphery portion 12b are connected by the perforated line f, but the perforated line f portion may be completely cut to provide a slit such as the slit d or e.

Also, the material of the tape body 11 is not limited to a synthetic resin, and the material of the release paper 12 is not limited to paper in a narrow sense and encompasses a synthetic resin and the like.

What is claimed is:

1. An adhesive tape comprising:
   a tape body,
   a layer of adhesive, and
   a release paper, wherein
   the layer of adhesive covers one side of the tape body, and
   the release paper is laminated on the tape body such that the layer of adhesive is disposed between the tape body and the release paper,
   the tape body comprises
      a tape body center portion,
      a tape body peripheral portion, and
      a plurality of tape body slits formed through the tape body, disposed in a predetermined shape, and providing a border between the tape body center portion and the tape body peripheral portion,
   the release paper comprises
      a release paper center portion,
      a release paper peripheral portion, and
      a plurality of release paper slits formed through the release paper disposed in the predetermined shape and providing a border between the release paper center portion and the release paper peripheral portion,
   wherein the release paper center portion is disposed so as to overlie the tape body center portion,
   wherein the tape body center portion is larger in area than the release paper center portion, and
   wherein at least a first portion of the tape body slits are aligned with, so as to overlie, a first portion of the release paper slits, and wherein at least a second portion of the tape body slits are not aligned with a second portion of the release paper slits.

2. The adhesive tape according to claim 1, wherein the release paper further comprises at least one set of perforations extending along a line from one of said release paper slits.

3. The adhesive tape according to claim 1, wherein the predetermined shape comprises an elongate rectangular shape such that the tape body peripheral portion surrounds the tape body center portion on exactly four sides, and the release paper peripheral portion surrounds the release paper center portion on exactly four sides.

4. An adhesive tape comprising:
   a tape body, a layer of adhesive, and
a release paper, wherein
the layer of adhesive covers one side of the tape body, and
the release paper is laminated on the tape body such that the layer of adhesive is disposed between the tape body and the release paper,
the tape body comprises
   a tape body center portion,
   a tape body peripheral portion, and
   a plurality of tape body slits formed through the tape body, disposed in a predetermined shape, and providing a border between the tape body center portion and the tape body peripheral portion,
the release paper comprises
   a release paper center portion,
   a release paper peripheral portion, and
   a plurality of release paper slits formed through the release paper disposed in the predetermined shape and providing a border between the release paper center portion and the release paper peripheral portion,
wherein the release paper center portion is disposed so as to overlie the tape body center portion,
wherein the tape body center portion is larger in area than the release paper center portion, and
wherein the predetermined shape is a U-shape such that the tape body peripheral portion surrounds the tape body center portion on exactly three sides, and the release paper peripheral portion surrounds the release paper center portion on exactly three sides.

5. The adhesive tape according to claim 1, wherein the predetermined shape comprises an elongate closed-body shape such that the tape body peripheral portion surrounds the tape body center portion on all sides, and the release paper peripheral portion surrounds the release paper center portion on all sides.

* * * * *